United States Patent [19]

Huat

[11] Patent Number: 4,462,167

[45] Date of Patent: Jul. 31, 1984

[54] ANGLE/LEVEL METER

[76] Inventor: David T. K. Huat, No. 27, Kenyalang Park, Chawan Rd., Kuching, Sarawak, Malaysia

[21] Appl. No.: 291,107

[22] Filed: Aug. 7, 1981

[51] Int. Cl.$^3$ ............................................. G01C 9/12
[52] U.S. Cl. ...................................... 33/339; 33/343; 33/369
[58] Field of Search ............. 33/1 LE, 339, 343, 369, 33/391, 413

[56] References Cited

U.S. PATENT DOCUMENTS

| | | | |
|---|---|---|---|
| 819,350 | 5/1906 | Janssen et al. | 33/369 |
| 1,323,018 | 11/1919 | Craddock | 33/369 |
| 2,847,765 | 8/1958 | Bateman | 33/391 |
| 3,591,925 | 7/1971 | Dupin | 33/369 |
| 4,274,203 | 6/1981 | Vasile | 33/339 |

FOREIGN PATENT DOCUMENTS

| | | | |
|---|---|---|---|
| 861917 | 2/1941 | France | 33/339 |
| 311512 | 1/1956 | Switzerland | 33/1 LE |
| 1198 | of 1872 | United Kingdom | 33/343 |
| 504651 | 4/1939 | United Kingdom | 33/1 LE |

Primary Examiner—Richard R. Stearns
Attorney, Agent, or Firm—Finnegan, Henderson, Farabow, Garrett & Dunner

[57] ABSTRACT

A hand-held instrument for leveling, and indicating and measuring angles for use with an anchored guide string, including a case, a fixed scale and a pendulum-activated indicator mounted in the case, a disc-shaped string direction sensor member rotatably mounted in the case and having a string alignment mark, and an aperture with peripherally located case axis marks for determining coincidence between the string alignment and case axis marks.

6 Claims, 5 Drawing Figures

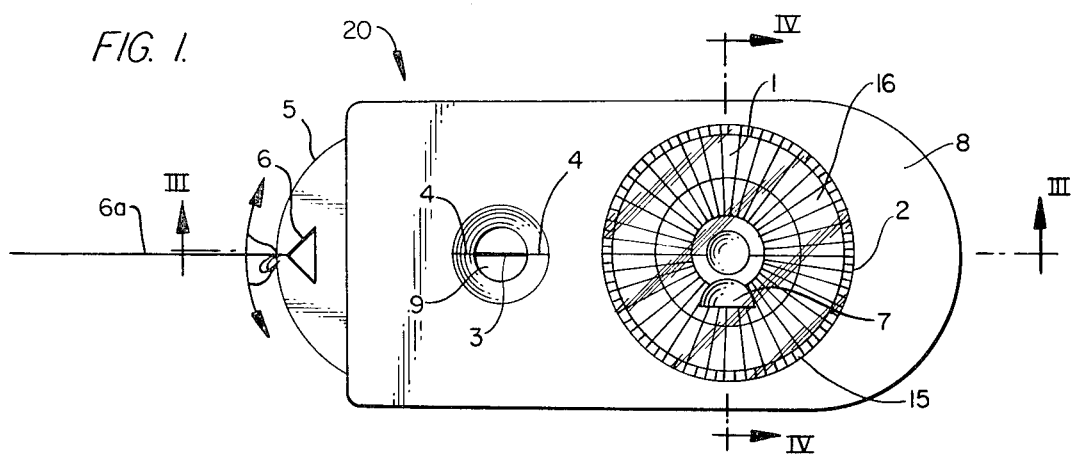
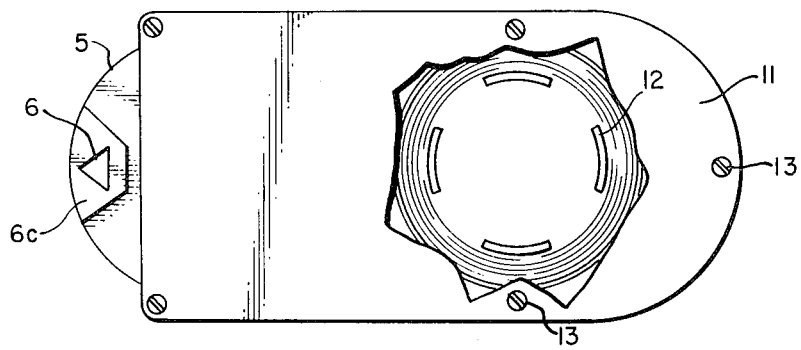
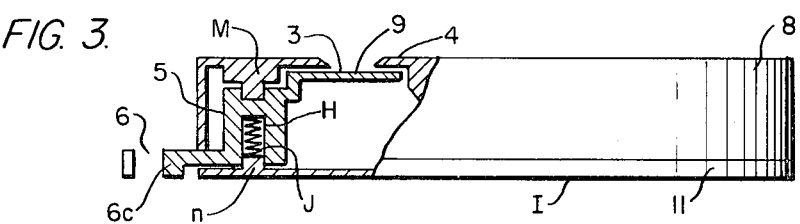
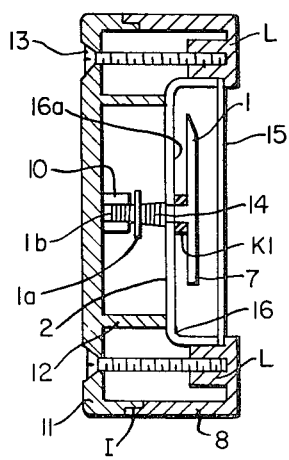
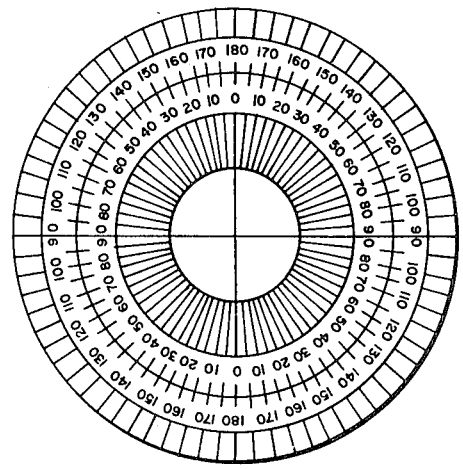

ANGLE/LEVEL METER

BACKGROUND OF THE INVENTION

The instrument consists of an elongated case with angle meter at one end and an angle tuning disc at the other end. The instrument is a hand-held device for measuring angles, leveling or angle location. Mounted in the centre of the meter is a steel needle that points to a 90° angle with respect to ground regardless of how the instrument is oriented in a vertical plane.

SUMMARY OF THE INVENTION

In accordance with the invention, as embodied and broadly described herein, the apparatus for indicating and measuring angles with respect to the vertical direction subtended by a taut string anchored at one end, the angles including angles substantially perpendicular to the vertical, comprises a case dimensioned and sized for being hand-held and having a longitudinal axis, meter means mounted in the case and having an indicator member for indicating the vertical direction, the meter means including a scale mounted in fixed relation to the case, means moveably mounted in the case and attached to the unanchored end of the string for sensing the direction of the string axis, means associated with the case and the sensing means for determining coincidence between the string axis and the case axis, the subtended angle being readable from the scale at the coincidence.

To obtain a desired angle for any setting up such as in a building construction, the instrument is held in an upright position as shown in FIG. 1 with the instrument's meter shown on the right. It is understood that the meter could be disposed to the left of the user depending upon the orientation of the instrument. The instrument is then adjusted vertically clockwise or anticlockwise until the needle points to the required angle shown on the meter surface. For example if a level angle is to be taken, the instrument is adjusted until the needle in the meter points to the 180° angle shown on the meter surface.

A string is fastened to the triangular opening in the angle tuning disc and held to the required length and adjusted by moving the instrument and attached string in a vertical manner until the line that can be seen on the outside of the projection window coincides with the line seen on the tuning disc inside the instrument case. (See arrows in FIG. 1 that illustrate how the string that is fastened to the tuning disc moves as the vertical orientiation of the instrument is changed. The angle of the string between the end fastened to the tuning disc and the other end fastened to a part of the construction to be leveled is then regarded as the guideline for the setting up.

Besides taking level or other vertical angles for setting up purpose, the instrument is also capable of measuring angles on any existing constructions without calculation. This device can also be used for drain water-flow construction applications with comparative ease and accuracy and in less time. No level reduction or calculation is required. Counter checking for the water-flow purposes can also be done by the instrument.

The instrument is easy to use and store as it has a convenient size and, either can be tucked into a pocket or put in a small bag.

BRIEF DESCRIPTION OF THE DRAWING

FIG. 1 is a front view of a leveling instrument made in accordance with the present invention;

FIG. 2 is a back view of the instrument shown in FIG. 1;

FIG. 3 is a cross-sectional side view of the instrument taken along line III—III as shown in FIG. 1;

FIG. 4 is a cross-sectional detail view of the angle meter part of the instrument taken along line IV—IV as shown in FIG. 1; and FIG. 5 is a detail view of the scale of the angle meter part of the instrument shown in FIG. 1.

DESCRIPTION OF THE PREFERRED EMBODIMENT

With reference to FIG. 1, the principle behind the setting of the angle by the meter is based on gravity as the needle designated as 1 is precisely designed to point accurately to a 90° angle with respect to ground regardless of how the instrument is vertically positioned. The principle is similar to the principle of the compass but utilizes gravitational, not magnetic, attraction. (See part No. 1.)

When the needle is adjusted to a 180° angle marked on the meter (part No. 16), the top and base of the instrument are regarded as the level angle. A round projection aperture or window adjacent to the meter is illustrated as part No. 9. The setting lines shown as part No. 4 and No. 3 refer to the markings on the outside and the inside instrument parts respectively. Part No. 4 refers to the instrument case longitudinal axis lines on both sides of the outside projection window and part No. 3 shows the string axis alignment line on the angle tuning disc inside the projection window.

The outside part of the disc (part No. 5) has a triangular opening (part No. 6) (See illustration for position) which is for the purpose of fastening the string (part No. 6a). The end corner of triangular opening 6 holding the string 6a is manufacture to be in line with the lines seen on the outside and inside of the projection window.

The center of the tuning disc 5 is mounted inside the instrument (FIGS. 1, 2 and 3) and designed to rotate freely according to the alignment of the string that is tied to it. Tuning disc 5 thus acts to sense the direction of the string axis when the string is pulled taut.

FIG. 2, part No. 6c illustrates the structure of the part that comes as part of the disc. This part is thicker for the purpose of having the back surface of the disc co-planar with the back surface of the instrument's case. (Refer to FIG. 3 part No. 6e for side view illustration).

The objective of this thicker structure of the disc is to hold the string co-planar with any flat object on which the back of the instrument is placed so as to ensure the accuracy of getting the string as guideline on both sides of a wall or any kind of vertical construction. Another purpose serves to prevent the tuning disc from rotating fully into the case so that the triangular opening (part No. 6) is always positioned on the outside of the instrument.

Specifically, FIG. 1 shows the front view of the leveling instrument designated generally as 20 and includes a casing formed by plate 11 and cover 8. The angle meter (part No. 2) is shown on the right of instrument 20 and the round projection window (part No. 9) and the angle tuner disc (part No. 5) are seen positioned to the left of the meter with part of the tuning disc covered by case cover 8. The round projection window (part No. 9) has a marked case axis line (part No. 4) which is taken to be the angle setter and a string alignment line on the inside part of the tuning disc (part No. 3). When adjusted to coincide with each other, the setting of the angle on the construction would then be achieved by a string (part No. 6a) that is tied to the triangular opening (part No. 6) in the exterior part of the tuning disc 5.

FIG. 4 which is the side view of the instrument shows the operating parts of the angle meter. The needle (part No. 1) including pointer 1c and pendulum 7 is manufactured as one integral part with the end of the needle shaft (part No. 1b) having screw threads. A threaded round washer (part No. 1a) is screwed onto the needle shaft to act as a stud against the spring (part No. 14) which provides tension by pushing the needle towards the bearing (part No. K1) on the inner surface 16a of the meter casing (part No. 16). The end of the needle shaft is fitted to part No. 1Q. This gives the needle efficiency in its rotation function. Part No. 13 is one of the screws that attach case plate 11 to case cover 8 via the mounting structure (part No. L). To protect the components on the meter surface, a round glass screen (part No. 15) is fitted to the meter casing 16 and tightly located in place by the instrument's case. Part No. 12 is one of the studs that holds meter casing 16, and thus glass screen 15, against case cover 8. The position of the screws 13 that hold case plate 11 and case cover 8 together is shown in FIG. 4.

FIG. 2 shows the back elevation of the instrument 20. The shaded part of the tuning disc (part No. 5) refers to the thicker structure (shown as side view in FIG. 3 part No. 6c). The triangular opening which is moulded into the thicker structure 6c of the disc 5 which serves to prevent the opening from rotating into the instrument case. Another purpose is that when the string 6a is tied to the disc, the thicker part of the disc will hold the string to be in the same plane with the back of the instrument's case.

FIG. 3 shows the side view of the structures of tuning disc 5. A steel helical spring J is inserted into the hollow axis (part No. H) of disc 5 and the parts 'M' and 'N' of the case cover 8 and case plate 11, respectively, hold the tuning disc in place. The spring allows the disc's rotation without unnecessary sideway movement, due to the centering function of the disc holding structures parts 'M' and 'N'. The projection window (part No. 9) is located to show the disc beneath it. The back and front parts of the instrument case are shown as 8 and 11. The fitting of the parts 8 and 11 is shown in FIG. 4 with the edge designed to fit tightly when the two parts are screwed together.

The case of the instrument can be made of hard plastics and molded in two pieces which are the case cover (refer to part No. 8) and the case plate part No. 11). These are to be shaped as shown in FIG. 3. The tuning disc can be made from plastics too. The operating and moveable parts such as the needle, the springs, washer and screws, are to be manufactured of appropriate substances like either bronze alloy or stainless steel. The screen of the meter (FIG. 4, Part No. 15) is to be either transparent plastic or glass.

FIG. 5 shows the circular scale on the meter surface 16a. To get a level, the instrument is placed with the longer side of the case formed by parts 8 and 11 in a horizontal position. The instrument is then adjusted until the needle on the meter surface points exactly to the angle which reads '180°' or based on the lower reading which reads '0°'. One end of string 6a is then tied to the triangular opening 6 in the tuning disc 5 (FIG. 1) and stretched to the required length. The string is held at the other end either by hand or tied to an object. The instrument 20 is then moved vertically up or down until the string axis alignment line (FIG. 1 Part No. 3) on the inner part of the tuning disc (angle tuner) FIG. 1 Part No. 5 and visible through projection window 9 coincides exactly with the case axis lines (FIG. 1 Part No. 4) shown on both sides of the round projection window (FIG. 1 Part No. 9). The string is then regarded as the guideline for the level indication. Based on the principle of getting the level or in other words, providing an indication of an angle which is 180° other angles can also be obtained by simply adjusting the needle to the required reading and operating the instrument in the same manner.

I claim:

1. Apparatus for indicating and measuring angles with respect to the vertical direction subtended by a taut string anchored at one end, the angles including angles substantially perpendicular to the vertical, the apparatus comprising:
   (a) a case dimensioned and sized for being hand-held and having a longitudinal axis;
   (b) meter means mounted in said case and having an indicator member for indicating the vertical direction, said meter means including a scale mounted in fixed relation to said case;
   (c) means moveably mounted in said case and attached to the unanchored mounted end of the string for sensing the alignment of the string axis;
   (d) means associated with said case and said sensing means for determining coincidence between the string axis and said longitudinal case axis, the subtended angle being readable from said scale at said coincidence.

2. Apparatus as in claim 1 wherein said indicator member is pendulum-activated.

3. Apparatus as in claim 1 wherein said sensing means includes a disc-shaped member rotatably mounted in said case and having a triangular-shaped aperture for attaching said string, said triangular aperture being oriented with a corner directed radially outward from the axis of rotation of said disc for establishing a preferred point of attachment of the string.

4. Apparatus as in claim 1 wherein said case has a planar plate portion for abutting stationary vertical objects to steady the instrument during use, and wherein said sensing means includes a rotatably mounted disc-shaped member for attachment to the string, said disc member having means for attaching the string with the string axis being held substantially coplanar with said plate portion.

5. Apparatus as in claim 1 wherein said sensing means includes a sensing member a part of which is positioned within said case, and wherein said coincidence determining means includes a string axis alignment line positioned on said part, and also an aperture with at least one peripherally located case longitudinal axis alignment line provided in said case at a position to uncover said string axis alignment line.

6. A method for indicating and measuring angles with the vertical direction subtended by a taut string anchored at one end, the method comprising the steps of:
   (a) determining the vertical direction using a pendulum-activated meter mounted in a hand-held case, the case having zat least one line indicating an axis of the case, and the meter having an indicator and also having a graduated scale fixed relative to the case;

(b) attaching the other end of the string to a string axis alignment sensor moveably mounted in the case, the sensor having a string axis alignment line;

(c) moving the case in a vertical plane till coincidence is achieved between the case axis line and the string axis alignment line; and (d) reading the subtended angle from the meter scale as established by the indicator.

* * * * *